（12）United States Patent
Kim et al.

(10) Patent No.: US 9,234,472 B2
(45) Date of Patent: Jan. 12, 2016

(54) DUAL FUEL ENGINE AND EVAPORATED NATURAL GAS SYSTEM

(75) Inventors: Hoisan Kim, Dunlap, IL (US); Mark F. Sommars, Hopewell, IL (US); Alan R. Stockner, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 282 days.

(21) Appl. No.: 13/569,260

(22) Filed: Aug. 8, 2012

(65) Prior Publication Data

US 2014/0041633 A1 Feb. 13, 2014

(51) Int. Cl.
| F02D 19/06 | (2006.01) |
| F02D 41/00 | (2006.01) |
| F02M 21/02 | (2006.01) |
| F02D 41/30 | (2006.01) |
| F02D 41/40 | (2006.01) |
| F02D 19/02 | (2006.01) |
| F02M 21/06 | (2006.01) |

(52) U.S. Cl.
CPC ............ *F02D 41/0025* (2013.01); *F02D 19/06* (2013.01); *F02D 41/0027* (2013.01); *F02D 41/3094* (2013.01); *F02D 41/403* (2013.01); *F02M 21/0212* (2013.01); *F02M 21/0245* (2013.01); *F02D 19/022* (2013.01); *F02D 19/027* (2013.01); *F02D 41/003* (2013.01); *F02M 21/06* (2013.01); *Y02T 10/36* (2013.01); *Y02T 10/44* (2013.01)

(58) Field of Classification Search
CPC ..... F02D 19/022; F02D 19/06; F02D 19/027; F02M 21/0212; F02M 21/0245
USPC ............ 123/456, 27 GE, 525, 526, 575–578, 123/447, 299, 300, 304; 701/102, 103, 104
See application file for complete search history.

(56) References Cited

U.S. PATENT DOCUMENTS

| 3,352,294 | A | | 11/1967 | Biller et al. | |
| 4,421,087 | A | * | 12/1983 | Schuurman | 123/445 |
| 4,817,568 | A | * | 4/1989 | Bedford | 123/431 |
| 5,243,821 | A | | 9/1993 | Schuck et al. | |
| 5,540,208 | A | | 7/1996 | Kikutani | |
| 5,832,906 | A | | 11/1998 | Douville et al. | |
| 5,890,459 | A | * | 4/1999 | Hedrick et al. | 123/27 GE |
| 6,178,755 | B1 | | 1/2001 | Castellanet | |
| 6,698,211 | B2 | | 3/2004 | Gustafson | |
| 6,898,940 | B2 | | 5/2005 | Gram et al. | |
| 7,308,889 | B2 | * | 12/2007 | Post et al. | 123/527 |

(Continued)

FOREIGN PATENT DOCUMENTS

| DE | 102009002578 | 10/2010 |
| EP | 1672269 | 6/2006 |

(Continued)

*Primary Examiner* — Mahmoud Gimie

(57) ABSTRACT

A dual fuel compression ignition engine operates by injecting gaseous fuel and liquid diesel fuel from a common fuel injector directly into each engine cylinder. The gaseous fuel is ignited by compression igniting a small pilot injection quantity of the liquid diesel fuel. Evaporated natural gas from a cryogenic tank and/or a fuel conditioning module is dosed into an intake manifold of the engine with an electronically controlled supply valve. The electronically controlled supply valve may open to supply evaporated gas to the intake manifold contingent upon combustion conditions in the engine cylinder demonstrating a low risk of methane slip, and the dosing quantities are limited to reduce risk of ignition of an air/gas mixture in the intake manifold.

14 Claims, 3 Drawing Sheets

(56) References Cited

U.S. PATENT DOCUMENTS

| | | |
|---|---|---|
| 7,373,931 B2 * | 5/2008 | Lennox et al. ............... 123/525 |
| 7,497,180 B2 | 3/2009 | Karlsson et al. |
| 7,913,496 B2 | 3/2011 | Batenburg et al. |
| 7,913,673 B2 * | 3/2011 | Vanderslice et al. ......... 123/525 |
| 7,918,213 B2 | 4/2011 | Althof et al. |
| 2003/0221433 A1 * | 12/2003 | Gustafson .................... 62/48.1 |
| 2011/0314839 A1 | 12/2011 | Brook et al. |

FOREIGN PATENT DOCUMENTS

| | | |
|---|---|---|
| JP | 2006348752 | 12/2006 |
| JP | 2009062982 | 3/2009 |

* cited by examiner

DUAL FUEL ENGINE AND EVAPORATED NATURAL GAS SYSTEM

TECHNICAL FIELD

The present disclosure relates generally to dual fuel engines that utilize natural gas as one of the fuels, and more particularly to an evaporated gas system for a dual fuel engine.

BACKGROUND

Natural gas has increasingly become an attractive alternative to other fuels for use in internal combustion engines. For instance, in one class of engines, a relatively large charge of natural gas is ignited by a compression igniting a small pilot quantity of liquid diesel fuel. In one application, dual fuel compression ignition engines are utilized for powering mining trucks. The natural gas may be stored in liquid form at very cold temperatures (e.g., −160° C.) and near atmospheric pressure. As the liquefied natural gas in the storage tank absorbs heat, some of the gas evaporates off. If the evaporated gas is not used fast enough during normal engine operations, the tank can eventually build enough pressure that it needs to vent the excess evaporated gaseous fuel. Since natural gas is primarily methane, venting the natural gas to atmosphere is considered very undesirable, as methane is known as an extremely powerful greenhouse gas. In practice, liquefied natural gas tanks are often constructed to vent at around 200 PSI. In order to be commercially viable, an engine system that utilizes natural gas might need to have some strategy for limiting the amount of natural gas, and especially methane, that is vented to atmosphere.

U.S. Pat. No. 6,698,211 teaches a natural gas fuel storage and supply system for gas burning engines of a vehicle. This reference teaches a passive strategy that routes evaporated natural gas from the storage tank to the intake manifold of the engine while the engine is in operation. This reference also teaches inclusion of a restriction orifice that limits the flow rate of evaporated natural gas so that the air/gas mixture traveling through the intake manifold is sufficiently lean to avoid, or limit the risk of, combustion of the air/gas mixture in the intake manifold. This reference also teaches that a flow control valve may be substituted in place of the restricting orifice. Although this reference recognizes a desirability to burn rather than vent evaporated natural gas from a storage tank, it fails to contemplate other problems that could arise in such systems, especially dual fuel compression ignition engine systems.

The present disclosure is directed toward one or more of the problems set forth above.

SUMMARY

In one aspect, a compression ignition dual fuel engine includes a gaseous fuel common rail fluidly connected to a plurality of fuel injectors that are each positioned for direct injection into one engine cylinder. A liquid fuel common rail is fluidly connected to the plurality of fuel injectors. A gaseous fuel supply and pressure control system is fluidly connected to the gaseous fuel common rail. A liquid fuel supply and pressure control system is fluidly connected to the liquid fuel common rail. An evaporated gas system is fluidly positioned between an electronically controlled supply valve fluidly connected to an intake manifold, and the gaseous fuel supply and pressure control system. The electronically controlled supply valve is movable between an open position and a closed position. Each of the fuel injectors has a liquid drain outlet fluidly connected to the liquid fuel supply and pressure control system. An electronic controller is in control communication with each of the plurality of fuel injectors, the liquid fuel supply and pressure control system, the gaseous fuel supply and pressure control system and the electronically controlled supply valve.

In another aspect, the compression ignition dual fuel engine is supported on a machined body and operably coupled to a conveyance of a machine.

In another aspect, a method of operating the dual fuel compression ignition engine includes opening the electronically controlled supply valve and combusting a mixture of evaporated gas from the intake manifold and injected gas from the fuel injector by compression igniting diesel fuel from the fuel injector in a plurality of engine cylinders during a first engine cycle. The electronically controlled supply valve is closed and injected gas from the fuel injector is combusted exclusively by compression igniting diesel fuel from the fuel injector in the plurality of engine cylinders during a second engine cycle.

DETAILED DESCRIPTION

Figure 1:
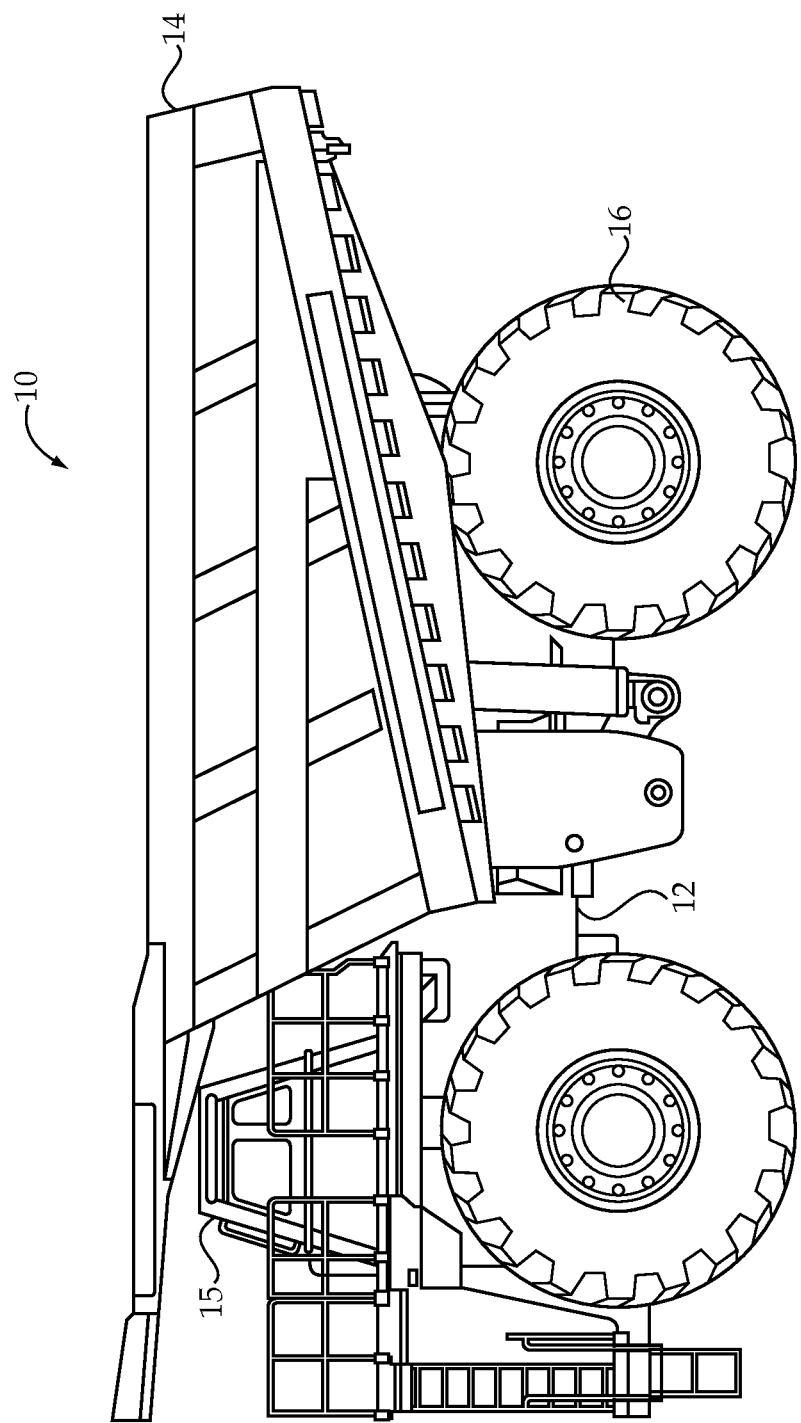
FIG. 1 is a side view of a machine according to one aspect of the present disclosure.

Referring initially to FIG. 1, a machine 10 includes a machine body 12 supported on a conveyance 16. In the illustrated embodiment, machine 10 is shown as a mining truck, and conveyance 16 is shown as wheels. However, machine 10 could take a wide variety of forms, and conveyance 16 could also vary substantially. For instance, conveyance 16 could be tracks or possibly even a propeller in the case of a machine in the form of a seagoing vessel. Mining truck 10 includes a dump body 14 pivotally attached to machine body 12, and also an operator station 15. One could expect a duty cycle for mining truck 10 to include time periods of idling without movement such as when mining truck 10 is waiting to receive a load, such as ore, in dump body 14, waiting to dump a load, and maybe even waiting to be refueled. Between these motionless idling periods, one might expect mining truck 10 to be operating at full power carrying a heaving load in dump body 14 may be up a steep grade at a mining site. During motionless idling, the engine powering machine 10 might consume only miniscule amounts of fuel. On the other hand, when operating at full power carrying a heavy load up a steep grade, one might expect mining truck 10 to consume relatively large quantities of fuel.

Figure 2:
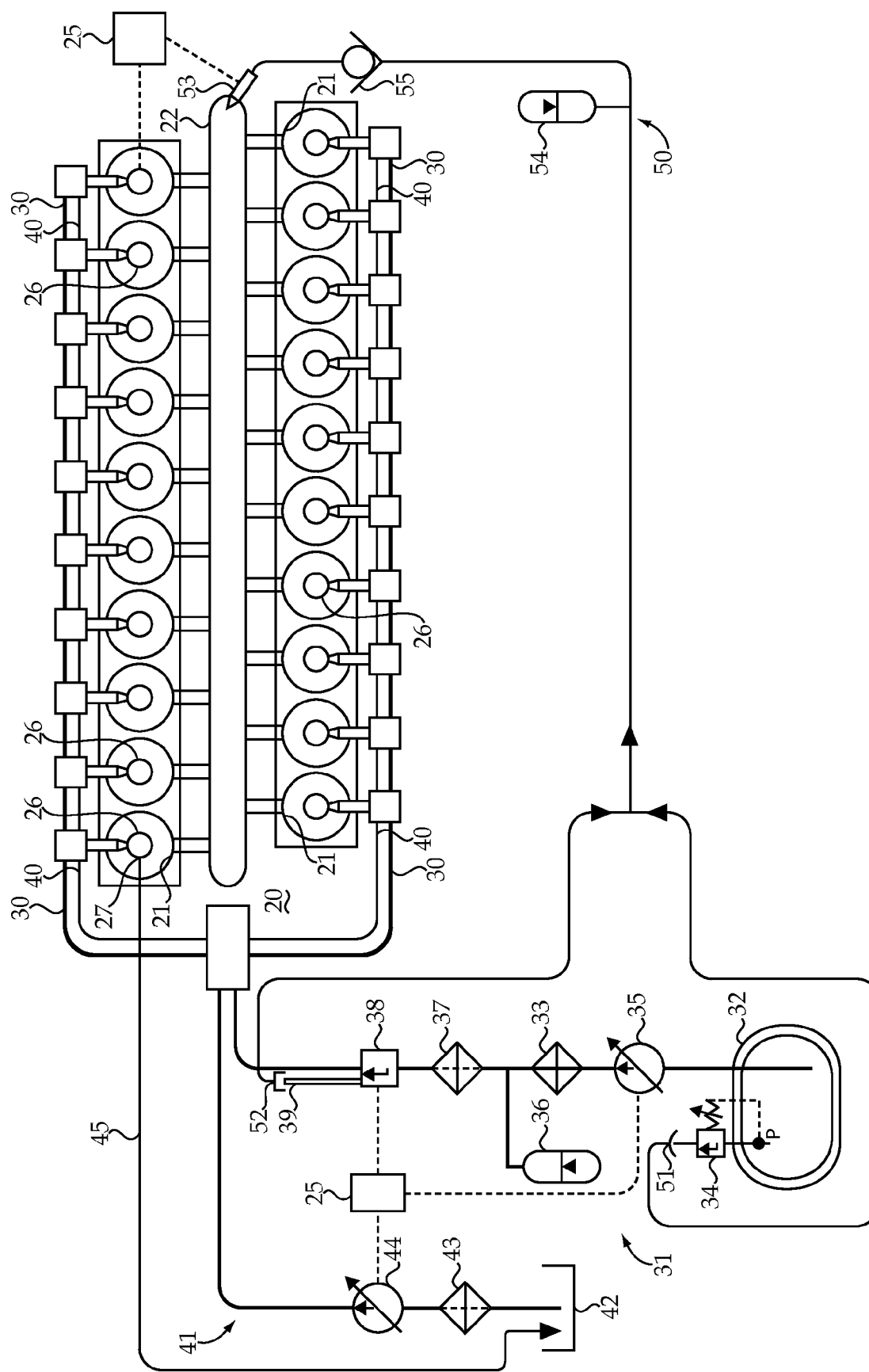
FIG. 2 is a schematic view of a dual fuel compression ignition engine for the machine of FIG. 1.

Referring in addition to FIG. 2, machine 10 may be powered by a compression ignition dual fuel engine 20 that includes a intake manifold 22 fluidly connected to a plurality engine cylinders 21. Compression ignition dual fuel engine 20 may be supported on machine body 12 and operably coupled to conveyance 16 in a known manner. For instance, engine 20 could be mechanically coupled to conveyance 16, or might even be coupled via an intervening electrical generator that supplies electrical power to motors that directly drive conveyance 16. In any event, direct or indirect coupling between engine 20 and conveyance 16 all fall within the intended scope of the present disclosure. In other words, if engine 20 must combust fuel in order to move machine 10 via conveyance 16, then engine 20 can be considered to be operably coupled to conveyance 16 according to the present disclosure. In the illustrated embodiment, engine 20 includes twenty engine cylinders 21, but engines with any numbers of cylinders would also fall within the intended scope of the present disclosure.

Engine 20 includes a gaseous fuel common rail 30 fluidly connected to a plurality of fuel injectors 26 that are each positioned for direct injection into one engine cylinder 21. A liquid fuel common rail 40 is also fluidly connected to the plurality of fuel injectors 26. The fluid connection between the respective common rails 30, 40 and fuel injectors 26 may be accomplished in a number of ways, such as by utilizing co-axial quill assembly (not shown). A gaseous fuel supply and pressure control system 31 is fluidly connected to the gaseous fuel common rail 30. A liquid fuel supply and pressure control system 41 is fluidly connected to the liquid fuel common rail 40. An evaporated gas system 50 is fluidly positioned between an electronically controlled supply valve 53 that is fluidly connected to the intake manifold 22, and the gaseous fuel supply and pressure control system 31. The electronically controlled supply valve 53 is movable between an open position and a closed position. However, those skilled in the art will appreciate that the electronically controlled supply valve may include a variety of features without departing from the present disclosure, such as, but not limited to an orifice, a variable flow rate capability, and maybe even some conventional device for pressure regulation. Each of the fuel injectors 26 includes a liquid drain outlet 27 fluidly connected to the liquid fuel supply and pressure control system 41 via a drain return line 45. In order to avoid too many overlapping fluid connections, drain return line 45 is shown only connected to one fuel injector 26, but is actually fluidly connected to the liquid drain outlet 27 of all twenty fuel injectors 26. This feature reflects the fact that the liquid fuel, which may comprise liquid diesel, may be utilized not only as an injection medium, but also as a control fluid which is returned for recirculation from the liquid drain outlet 27. An electronic controller 25 is in control communication with each of the plurality of fuel injectors 26, the liquid fuel supply and pressure control system 41, the gaseous fuel supply and pressure control system 31 and the electronically controlled supply valve 53.

The liquid fuel supply and pressure control system 41 may include a low pressure tank 42 containing liquid diesel fuel, a filter 43 and a high pressure pump 44 supplies liquid fuel to, and controls pressure in, liquid fuel common rail 40. High pressure pump 44 may be a variable output pump comprising one of several different types of structures known in the art including but not limited to inlet metered, variable displacement, spill valve controlled or any type of pump that is electronically controlled to vary the output from the pump 44 to control pressure in the liquid fuel common rail 40 in a manner well known in the art.

The gaseous fuel supply and pressure control system may include a cryogenic tank 32, a variable displacement pump 35, a heat exchanger 33, an accumulator 36, a filter 37 and a fuel conditioning module 38. Variable displacement pump 35 and fuel conditioning module 38 may be in control communication with electronic controller 35 in order to supply gaseous fuel to, and control pressure in, the gaseous fuel common rail 30. Cryogenic tank 32 may contain a supply of chilled liquefied natural gas. A pressure relief valve 34 may be part of cryogenic tank 32, and a vent 39 may be a portion of fuel conditioning module 38.

The evaporated gas system 50 may include an accumulator 54 with a capacity or volume greater than the gaseous fuel common rail 30. Evaporated gas system 50 may also include a check valve 55 that can be utilized to prevent backflow of air from intake manifold 22, such as what might occur if electronically controlled supply valve 53 is open when pressure in intake manifold 22 exceeds the pressure in evaporated gas system 50. The pressure relief valve 34 of cryogenic tank 32 may be fluidly connected to a first inlet 51 of the evaporated gas system 50, and the vent 39 of fuel conditioning module 38 may be fluidly connected to a second inlet 52 of evaporated gas system 50. It is this aspect of the disclosure that allows capture of evaporated natural gas from cryogenic tank when conditions cause pressure in the tank to exceed the valve opening pressure of the pressure relief valve 34 and also capture evaporate gas at vent 39 from fuel conditioning module 38 that might have otherwise been vented to atmosphere.

The present disclosure contemplates the use of both accumulator 54 and the electronically controlled supply valve 53 to store evaporated gas when conditions are less favorable for channeling the evaporated gas into intake manifold 22, and also dose evaporated gas into intake manifold 22 when conditions are more favorable. Among the considerations that could be utilized in determining when conditions are favorable might include, but is not limited to, deciding if combustion conditions in engine 20 have an elevated risk of methane slip, which would be unfavorable, or a reduced risk of methane slip, which would be considered a favorable condition. For instance, one might consider engine 20 operating at a high load condition as representing a higher risk of methane slip since a relatively large charge of natural gas will be ignited by compression igniting a small pilot quantity of diesel fuel. For reasons beyond the scope of the present disclosure, one might expect larger quantities of unburned natural gas to escape from engine cylinders 21 when operating in high load conditions. Methane slip is a risk because the unburned natural gas may largely comprise methane. Lower risk of methane slip might correspond to combustion conditions associated with low load or idling, when all or almost all of the fuel in the respective engine cylinders 21 is combusted, with little or no unburned fuel escaping from the respected engine cylinders 21. Another consideration in determining whether conditions are favorable to open the electronically controlled supply valve 53 to dose evaporated gas into intake manifold 22 might include whether the mixture of air and fuel in the intake manifold reaches a ratio that risks early and undesirable ignition of the mixture in the intake manifold. Thus, one might expect electronic controller 25 to monitor the air fuel ratio in intake manifold 22, such as by monitoring the flow rate through electronically controlled supply valve 53 and the boost pressure supplying air to intake manifold 22 in a conventional manner to ensure that the mixture is sufficiently lean to present a low risk of ignition. Another consideration might be simply to avoid opening electronically controlled supply valve 53 when pressure in intake manifold 22 exceeds the pressure in evaporated gas system 50. These and other considerations might be continuously taken into account by electronic controller 25 by including an evaporated gas dosing algorithm 60 that is configured to communicate an open signal and a closed signal to the electronically controlled supply valve 53.

Figure 3:
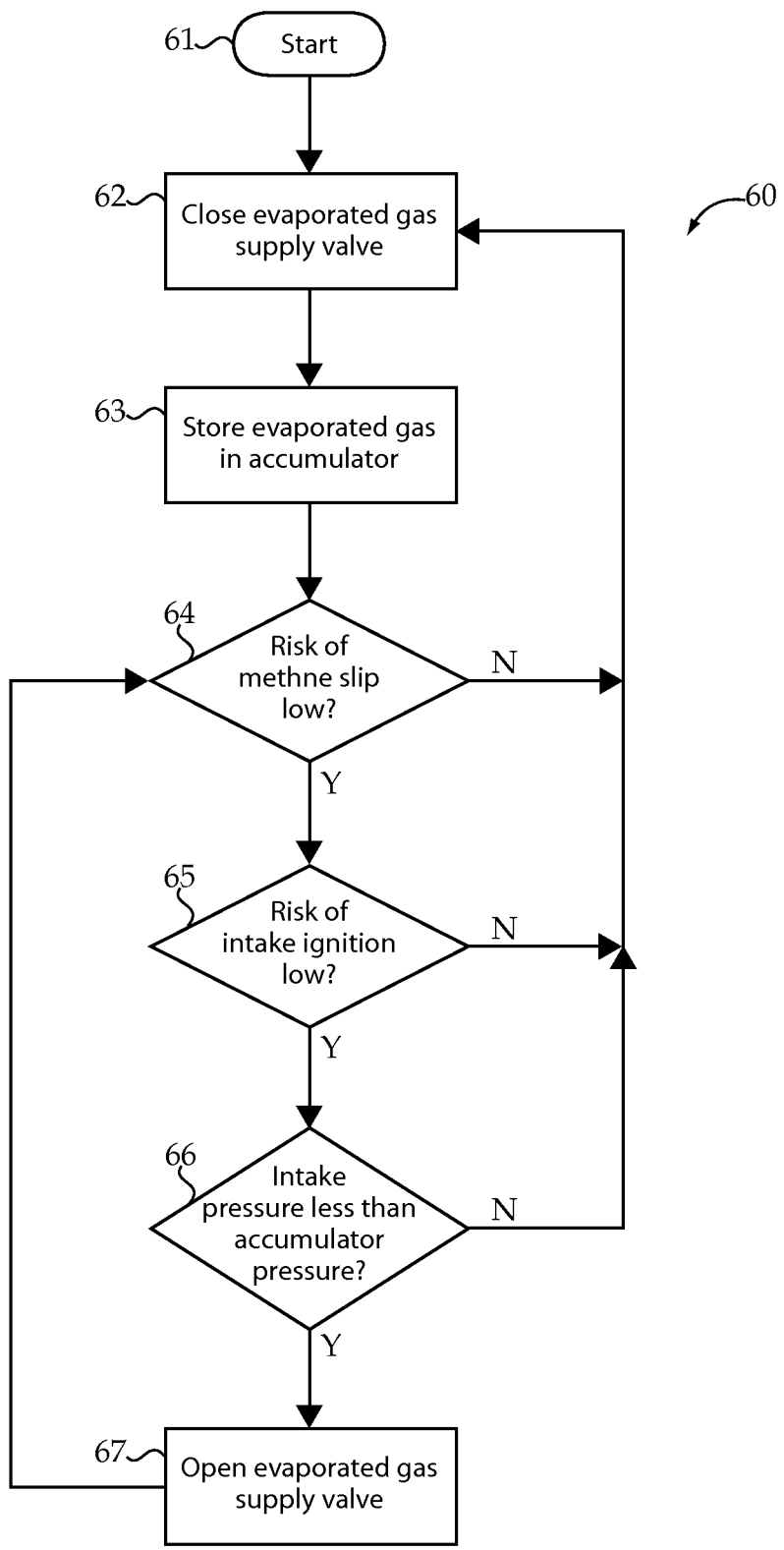
FIG. 3 is a logic flow diagram for an evaporated gas dosing algorithm according to another aspect of the present disclosure.

Referring in addition to FIG. 3, a logic flow diagram for one evaporated gas dosing algorithm 60 according to the present disclosure is shown. The logic begins at start 61 and proceeds to block 62 where the evaporated gas supply valve 53 is closed. The closure of evaporated gas supply valve 53 may be accomplished simply by ceasing transmission of an open signal and relying upon some mechanical bias to normally maintain electronically controlled supply valve 53 in a closed position. Thus, a closed signal in the context of the present disclosure might simply mean the absence of an open signal, which may comprise electrical energy to actuate an electrical actuator to move the electronically controlled supply valve 53 from a biased closed position toward an open position in a manner associated with many valves known in the art. At block 63, evaporated gas is stored in accumulator 54. Thus, evaporated gas from either cryogenic tank 32 or fuel conditioning module 38 may enter evaporated gas system 50 and be stored in accumulator 54 whenever engine 20 is operating or not. Next, at query 64, the logic determines whether the risk of methane slip is low. Depending upon the particular engine, engineers can easily determine what combustion load conditions correspond to when all or almost all of the fuel in the individual cylinders 21 can be expected to be combusted. Thus, implementation of query 64 may simply be based upon electronic controller 25 deciding whether or not the engine load condition is above some threshold. In general, one could expect the risk of methane slip to be low during low load and idle conditions. Depending upon the particular application, the logic may simply determine that the risk of methane slip is low only when machine 10 is idling according to one embodiment of the present disclosure. If the evaporated gas dosing algorithm 60 determines that the risk of methane slip is not low, the logic returns to block 62 to maintain the evaporated gas supply valve 53 closed. On the other hand, if it is determined that the risk of methane slip is low, the logic will advance to query 65 where it is determined whether the risk of intake ignition is low. As discussed earlier, this might be accomplished by electronic controller 25 monitoring the air fuel ratio in intake manifold 22. For instance, depending upon the particular engine, the risk of intake ignition could be considered to be low when the air fuel ratio in intake manifold 22 is below some predetermined percentage. If, for whatever reason, the air fuel ratio in the intake manifold 22 exceeded this threshold, the logic would return to block 62 and maintain or move the evaporated gas supply valve 53 to a closed condition. On the other hand, if the air fuel ratio and intake manifold 22 is below that predetermined threshold demonstrating a low risk of intake ignition, the logic might advance to query 66 where electronic controller 25 would determine whether the pressure in intake manifold 22 was less than the pressure in accumulator 54. If this condition is satisfied, the logic would advance to block 63 and open the evaporated gas supply valve 53 to dose a quantity of evaporated gas into intake manifold 22. However, if the pressure in intake manifold 22 is greater than the pressure in evaporated gas system 50, the logic would loop back to block 62 and command closure or maintain closure of evaporate gas supply valve 53.

INDUSTRIAL APPLICABILITY

The present disclosure finds general applicability to any engine that burns gaseous fuel originating from liquefied storage tank. The present disclosure finds general applicability to such engines where there is a desire to avoid venting the potentially harmful greenhouse gas methane to atmosphere. The present disclosure finds particular applicability to dual fuel engines that combust liquid diesel fuel and natural gas fuel. Finally, the present disclosure finds specific applicability when a dual fuel compression ignition engine is used to power a machine, such as a mining truck.

When in operation, one could expect engine 20 to compression ignite a relatively small quantity of liquid diesel fuel to in turn ignite a much larger charge of natural gas. At relatively low loads and maybe at idle, engine 20 may combust a higher ratio of diesel fuel to natural gas fuel than the ratio that could be associated at higher loads. In fact, during idle conditions engine 20 may utilize no gas from gaseous fuel common rail 30 to maintain operation of engine 20. However, those skilled in the art will appreciate that the fueling ratio conditions are somewhat a matter of design choice and could vary substantially from one engine to another without departing from the present disclosure. In any event, when conditions are satisfied and evaporated gas is dosed into the intake manifold 22, the quantities of evaporated gas that are combusted may or may not be sufficient to effect the fueling logic associated with injection of either liquid diesel or natural gas from the individual fuel injectors 26. In other words, the heat release contribution of burning the evaporated gas from the evaporated gas system 50 might be so low as to not significantly contribute to the heat release of liquid diesel and/or injected gas at a given engine operating condition. On the other hand, if the heat release is significant, one might expect the engine governor to decrease one of liquid diesel or more likely injected natural gas, to compensate for the additional fuel provided by the evaporated natural gas system 50 in order to maintain engine speed at the governed state.

When in operation, electronically controlled supply valve 53 maybe opened for combusting a mixture of evaporated gas from the intake manifold 22 and injected gas from the fuel injector 26 by compression igniting diesel from the fuel injector 26 in a plurality of engine cylinders 21 during a first engine cycle. In addition, one could expect the electronically controlled supply valve 53 to be closed and the engine 20 combust exclusively injected gas from the fuel injector 26 by compression igniting diesel fuel from fuel injector 26 in the plurality of engine cylinders 21 during a second and different engine cycle. Those skilled in the art will appreciate that an engine cycle according to the present disclosure includes an intake stroke, a compression stroke, an expansion stroke and an exhaust stroke. As discussed earlier, closure of the electronically controlled supply valve 53 may be performed when combustion conditions correspond to an elevated risk of methane slip, whereas opening of the electronically controlled supply valve 53 may be performed when combustion conditions correspond to a reduced risk of methane slip. Those skilled in the art will recognize that the term "methane slip" refers to escape of unburned methane from an exhaust pipe associated with engine 20. During normal operating conditions as engine 20 moves between idling and loaded conditions, one could expect evaporated gas to be stored in accumulator 54. When electronically controlled supply valve 53 is opened, some of the stored evaporated gas would naturally be removed from accumulator 54 for dosing into intake manifold 22. Also during normal operation, one could expect evaporated gas from the fuel conditioning module 38 and maybe evaporated gas from cryogenic tank 32 to be moved to accumulator 54. In addition to closing electronically controlled supply valve 53 contingent upon combustion conditions corresponding to an elevated risk of methane slip, supply valve 53 may also be closed contingent on an air/fuel ratio in the intake manifold 22 corresponding to an elevated risk of intake ignition. In addition, the present disclosure contemplates that the specific air/fuel ratio associated with an elevated risk of intake ignition might also vary both with engine operating conditions and with atmospheric conditions. For instance, an elevated risk of intake ignition may correspond to one air fuel ratio at low altitudes, but a different air/fuel ratios at higher altitudes. Other conditions known in the art could also contribute to a variable air/fuel ratio associated with an elevated risk of intake ignition.

As discussed earlier, closure of the electronic controlled supply valve 53 is performed responsive to a closed signal communicated from the electronic controller 25 to the supply valve 53. Depending upon the structure of electronically controlled supply valve 53, the close signal might simply be nothing or the absence of an open signal, or the actuator associated with electronically controlled supply valve 53 could require some active signal such as in the case if electronically controlled supply valve 53 were biased toward an open condition. Likewise, opening of the electronically controlled supply valve 53 is performed responsive to an open signal communicated from the electronic controller to the supply valve. As with the closed signal, the open signal could, depending upon the structure and actuator associated with electronically controlled supply valve 53 may simply consist of the absence of a closed signal, or may comprise some positive electrical energy being supplied to an actuator of electronically controlled supply valve 53 to open the same.

The present disclosure teaches a way of operating an engine that utilizes natural gas with a strategy of avoiding venting excess natural gas to atmosphere to avoid releasing the potentially harmful greenhouse gas methane. Instead of venting the excess or evaporated gas to atmosphere, the present disclosure teaches burning of that evaporated gas in engine 20 when various contingent conditions are satisfied according to an evaporated gas dosing algorithm 60.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A compression ignition dual fuel engine comprising:
    a gaseous fuel common rail fluidly connected to a plurality of fuel injectors each positioned for direct injection into one engine cylinder;
    a liquid fuel common rail fluidly connected to the plurality of fuel injectors;
    a gaseous fuel supply and pressure control system fluidly connected to the gaseous fuel common rail;
    a liquid fuel supply and pressure control system fluidly connected to the liquid fuel common rail;
    an evaporated gas system fluidly positioned between an electronically controlled supply valve fluidly connected to an intake manifold and the gaseous fuel supply and pressure control system, and the electronically controlled supply valve being movable between an open position and a closed position;
    each of the fuel injectors having a liquid drain outlet fluidly connected to the liquid fuel supply and pressure control system; and
    an electronic controller in control communication with each of the plurality of fuel injectors, the liquid fuel supply and pressure control system, the gaseous fuel supply and pressure control system and the electronically controlled supply valve, the electronic controller configured to selectively and independently control each of the plurality of fuel injectors, the liquid fuel supply and pressure control system, the gaseous fuel supply and pressure control system and the electronically controlled supply valve, the electronic controller further configured to control the electronically controlled supply valve based at least upon a risk of methane slip, a risk of intake ignition, or a load on the compression ignition dual fuel engine, or a combination thereof.

2. The compression ignition engine of claim 1 wherein the evaporated gas system includes an accumulator with a volume greater than the gaseous fuel common rail.

3. The compression ignition engine of claim 1 wherein gaseous fuel supply and pressure control system includes a cryogenic tank fluidly connected to a first inlet to the evaporated gas system, and a fuel conditioning module fluidly connected to a second inlet to the evaporated gas system.

4. The compression ignition engine of claim 1 wherein the electronic controller includes an evaporated gas dosing algorithm configured to communicate an open signal and a close signal to the electronically controlled supply valve.

5. The compression ignition engine of claim 4 wherein the evaporated gas system includes an accumulator with a volume greater than the gaseous fuel common rail.

6. The compression ignition engine of claim 5 wherein the evaporated gas dosing algorithm is configured to communicate the close signal contingent on combustion conditions corresponding to an elevated risk of methane slip, and the open signal contingent on combustion conditions corresponding to a reduced risk of methane slip.

7. The compression ignition engine of claim 6 wherein the evaporated gas dosing algorithm is configured to communicate the close signal contingent on an air/fuel ratio in the intake manifold corresponding to an elevated risk of intake ignition, and the open signal contingent on the air/fuel ratio in the intake manifold corresponding to a reduced risk of intake ignition.

8. The compression ignition engine of claim 7 wherein the gaseous fuel supply and pressure control system includes a cryogenic tank fluidly connected to a first inlet to the evaporated gas system, and a fuel conditioning module fluidly connected to a second inlet to the evaporated gas system.

9. A machine comprising: a machine body supported on a conveyance; and
    a compression ignition dual fuel engine supported on the machine body and operably coupled to the conveyance, and comprising:
    a gaseous fuel common rail fluidly connected to a plurality of fuel injectors each positioned for direct injection into one engine cylinder;
    a liquid fuel common rail fluidly connected to the plurality of fuel injectors;
    a gaseous fuel supply and pressure control system fluidly connected to the gaseous fuel common rail;
    a liquid fuel supply and pressure control system fluidly connected to the liquid fuel common rail;
    an evaporated gas system fluidly positioned between an electronically controlled supply valve fluidly connected to an intake manifold and the gaseous fuel supply and pressure control system, and the electronically controlled supply valve being movable between an open position and a closed position;
    each of the fuel injectors having a liquid drain outlet fluidly connected to the liquid fuel supply and pressure control system; and
    an electronic controller in control communication with each of the plurality of fuel injectors, the liquid fuel supply and pressure control system, the gaseous fuel supply and pressure control system and the electronically controlled supply valve, the electronic controller configured to selectively and independently control each of the plurality of fuel injectors, the liquid fuel supply and pressure control system, the gaseous fuel supply and pressure control system and the electronically controlled supply valve, the electronic controller further configured to control the electronically controlled supply valve based at least upon a risk of methane slip, a risk of intake ignition, or a load on the compression ignition dual fuel engine, or a combination thereof.

10. The machine of claim 9 wherein the gaseous fuel supply and pressure control system includes a cryogenic tank fluidly connected to a first inlet to the evaporated gas system, and a fuel conditioning module fluidly connected to a second inlet to the evaporated gas system.

11. The machine of claim 9 wherein the electronic controller includes an evaporated gas dosing algorithm configured to communicate an open signal and a close signal to the electronically controlled supply valve.

12. The machine of claim 10 wherein the evaporated gas system includes an accumulator with a volume greater than the gaseous fuel common rail.

13. The machine of claim 11 wherein the evaporated gas dosing algorithm is configured to communicate the close signal contingent on an air/fuel ratio in the intake manifold corresponding to an elevated risk of intake ignition, and the open signal contingent on the air/fuel ratio in the intake manifold corresponding to a reduced risk of intake ignition.

14. The machine of claim 12 wherein the evaporated gas dosing algorithm is configured to communicate the close signal contingent on combustion conditions corresponding to an elevated risk of methane slip, and the open signal contingent on combustion conditions corresponding to a reduced risk of methane slip.

* * * * *